US010652146B1

(12) United States Patent
Tringale et al.

(10) Patent No.: US 10,652,146 B1
(45) Date of Patent: May 12, 2020

(54) SYSTEM AND METHOD FOR HIGH AVAILABILITY OF ETHERNET NETWORK DURING STORAGE SYSTEM FAILURE

(71) Applicant: EMC IP Holding Company, LLC, Hopkinton, MA (US)

(72) Inventors: Alesia A. Tringale, Worcester, MA (US); Abhinav Garg, Barrington, IL (US); Julie Zhivich, Westborough, MA (US); Adwait M. Sathe, Nashua, NH (US)

(73) Assignee: EMC IP Holding Company LLC, Hopkinton, MA (US)

( * ) Notice: Subject to any disclaimer, the term of this patent is extended or adjusted under 35 U.S.C. 154(b) by 3 days.

(21) Appl. No.: 15/798,663

(22) Filed: Oct. 31, 2017

(51) Int. Cl.
*H04L 12/721* (2013.01)
(52) U.S. Cl.
CPC .................................. *H04L 45/72* (2013.01)
(58) Field of Classification Search
CPC ....................................................... H04L 45/72
See application file for complete search history.

(56) References Cited

U.S. PATENT DOCUMENTS

| | | | |
|---|---|---|---|
| 2005/0120160 A1* | 6/2005 | Plouffe | G06F 9/45537 711/1 |
| 2010/0103936 A1* | 4/2010 | De Cnodder | H04L 12/2892 370/392 |
| 2012/0023340 A1* | 1/2012 | Cheung | G06F 1/266 713/300 |
| 2014/0122675 A1* | 5/2014 | Cohen | H04L 12/413 709/223 |
| 2015/0222533 A1* | 8/2015 | Birrittella | H04L 45/66 370/392 |
| 2016/0315848 A1* | 10/2016 | Weinstein | H04L 12/4633 |
| 2019/0004901 A1* | 1/2019 | Ryan | G06F 11/1441 |

\* cited by examiner

*Primary Examiner* — Samina F Choudhry
(74) *Attorney, Agent, or Firm* — Brian J. Colandreo; Mark H. Whittenberger; Holland & Knight LLP

(57) ABSTRACT

A method, computer program product, and computer system for identifying, by a computing device, a trigger event associated with an Ethernet switch. Ethernet based control information may be encapsulated into an InfiniBand based packet. The InfiniBand based packet with the Ethernet based control information may be transmitted over the InfiniBand fabric from a source to a destination. The Ethernet based control information may be decapsulated from the Infini-Band based packet at the destination.

14 Claims, 7 Drawing Sheets

SYSTEM AND METHOD FOR HIGH AVAILABILITY OF ETHERNET NETWORK DURING STORAGE SYSTEM FAILURE

BACKGROUND

Generally, with the increasing amounts of information being stored, it may be beneficial to efficiently store and manage that information. While there may be numerous techniques for storing and managing information, each technique may have tradeoffs between reliability and efficiency.

BRIEF SUMMARY OF DISCLOSURE

In one example implementation, a method, performed by one or more computing devices, may include but is not limited to identifying, by a computing device, a trigger event associated with an Ethernet switch. Ethernet based control information may be encapsulated into an InfiniBand based packet. The InfiniBand based packet with the Ethernet based control information may be transmitted over the InfiniBand fabric from a source to a destination. The Ethernet based control information may be decapsulated from the InfiniBand based packet at the destination.

One or more of the following example features may be included. An environment associated with the Ethernet switch may be monitored. The environment associated with the Ethernet switch may include one or more power states. At least one of the one or more power states may indicate usage of backup power. A tunnel state may be synchronized. The trigger event may enable transmitting the InfiniBand based packet with the Ethernet based control information over the InfiniBand fabric. A second trigger event associated with the Ethernet switch may be identified, wherein the second trigger event may disable transmitting the InfiniBand based packet with the Ethernet based control information over the InfiniBand fabric.

In another example implementation, a computing system may include one or more processors and one or more memories configured to perform operations that may include but are not limited to identifying a trigger event associated with an Ethernet switch. Ethernet based control information may be encapsulated into an InfiniBand based packet. The InfiniBand based packet with the Ethernet based control information may be transmitted over the InfiniBand fabric from a source to a destination. The Ethernet based control information may be decapsulated from the InfiniBand based packet at the destination.

One or more of the following example features may be included. An environment associated with the Ethernet switch may be monitored. The environment associated with the Ethernet switch may include one or more power states. At least one of the one or more power states may indicate usage of backup power. A tunnel state may be synchronized. The trigger event may enable transmitting the InfiniBand based packet with the Ethernet based control information over the InfiniBand fabric. A second trigger event associated with the Ethernet switch may be identified, wherein the second trigger event may disable transmitting the InfiniBand based packet with the Ethernet based control information over the InfiniBand fabric.

In another example implementation, a computer program product may reside on a computer readable storage medium having a plurality of instructions stored thereon which, when executed across one or more processors, may cause at least a portion of the one or more processors to perform operations that may include but are not limited to identifying a trigger event associated with an Ethernet switch. Ethernet based control information may be encapsulated into an InfiniBand based packet. The InfiniBand based packet with the Ethernet based control information may be transmitted over the InfiniBand fabric from a source to a destination. The Ethernet based control information may be decapsulated from the InfiniBand based packet at the destination.

One or more of the following example features may be included. An environment associated with the Ethernet switch may be monitored. The environment associated with the Ethernet switch may include one or more power states. At least one of the one or more power states may indicate usage of backup power. A tunnel state may be synchronized. The trigger event may enable transmitting the InfiniBand based packet with the Ethernet based control information over the InfiniBand fabric. A second trigger event associated with the Ethernet switch may be identified, wherein the second trigger event may disable transmitting the InfiniBand based packet with the Ethernet based control information over the InfiniBand fabric.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
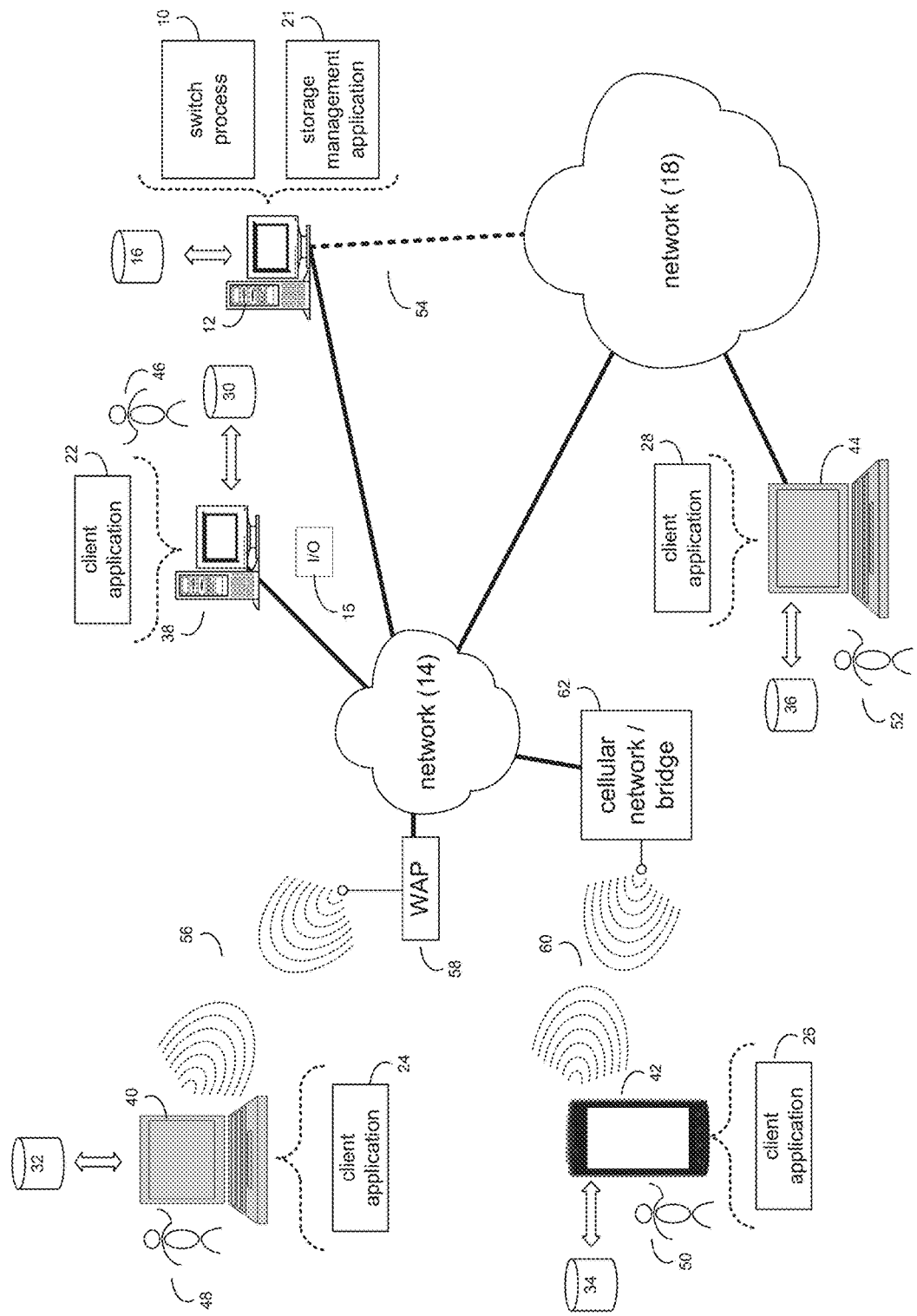
FIG. 1 is an example diagrammatic view of a switch process coupled to an example distributed computing network according to one or more example implementations of the disclosure.

System Overview:

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java®, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures. For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown switch process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer(s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a switch process, such as switch process 10 of FIG. 1, may identify, by a computing device, a trigger event associated with an Ethernet switch. Ethernet based control information may be encapsulated into an InfiniBand based packet. The InfiniBand based packet with the Ethernet based control information may be transmitted over the InfiniBand fabric from a source to a destination. The Ethernet based control information may be decapsulated from the InfiniBand based packet at the destination.

In some implementations, the instruction sets and subroutines of switch process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network; or an intranet, for example.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, switch process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network. An example cloud computing environment that may be used with the disclosure may include but is not limited to, e.g., Elastic Cloud Storage™ from Dell EMC™ of Hopkinton, Mass. In some implementations, other cloud computing environments may be used without departing from the scope of the disclosure.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, switch process 10 and/or storage management application 21 may be accessed via one or more of client applications 22, 24, 26, 28. In some implementations, switch process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within switch process 10, a component of switch process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of switch process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a media (e.g., video, photo, etc.) capturing device, and a dedicated network device. Client electronic devices 38, 40, 42, 44 may each execute an operating system, examples of which may include but are not limited to, Android™, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of switch process 10 (and vice versa). Accordingly, in some implementations, switch process 10 may be a purely server-side application, a purely client-side application, or a hybrid server-side/client-side application that is cooperatively executed by one or more of client applications 22, 24, 26, 28 and/or switch process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, switch process 10, and storage management application 21, taken singly or in any combination, may effectuate some or all of the same functionality, any description of effectuating such functionality via one or more of client applications 22, 24, 26, 28, switch process 10, storage management application 21, or combination thereof, and any described interaction(s) between one or more of client applications 22, 24, 26, 28, switch process 10, storage management application 21, or combination thereof to effectuate such functionality, should be taken as an example only and not to limit the scope of the disclosure.

In some implementations, one or more of users 46, 48, 50, 52 may access computer 12 and switch process 10 (e.g., using one or more of client electronic devices 38, 40, 42, 44) directly through network 14 or through secondary network 18. Further, computer 12 may be connected to network 14 through secondary network 18, as illustrated with phantom link line 54. Switch process 10 may include one or more user interfaces, such as browsers and textual or graphical user interfaces, through which users 46, 48, 50, 52 may access switch process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Figure 2:
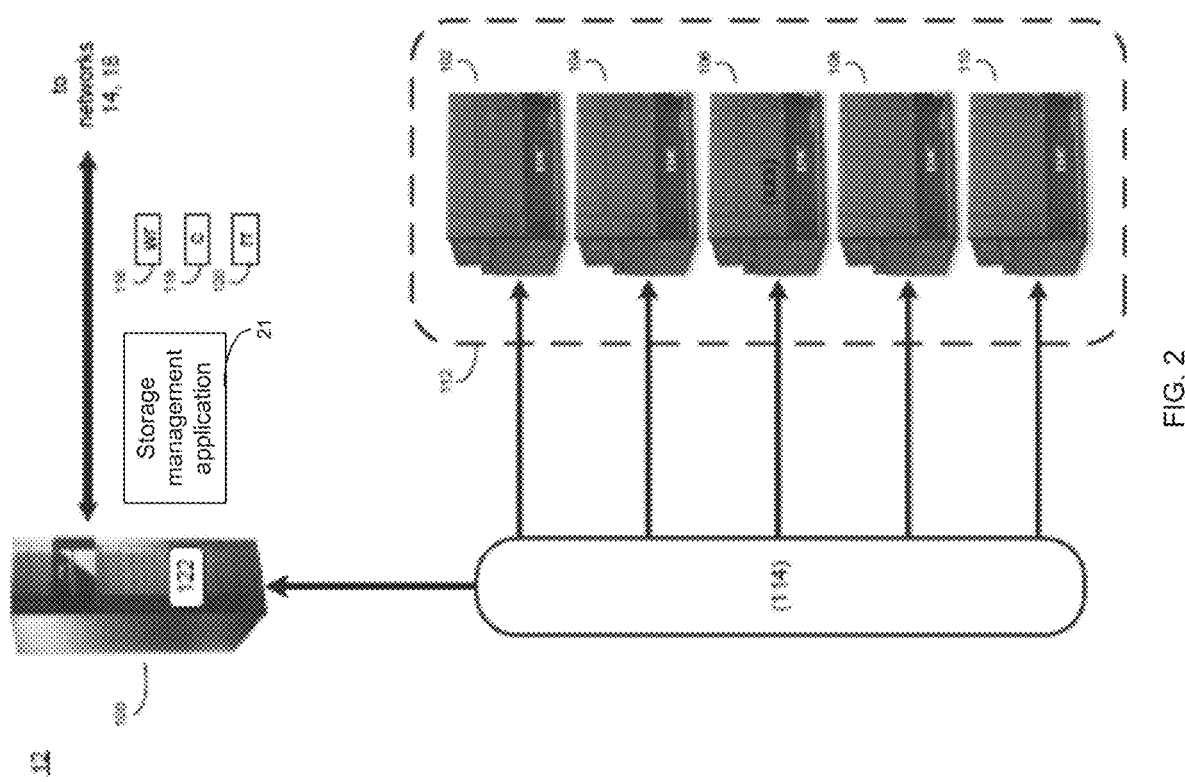
FIG. 2 is an example diagrammatic view of a computer of FIG. 1 according to one or more example implementations of the disclosure.
Figure 3:
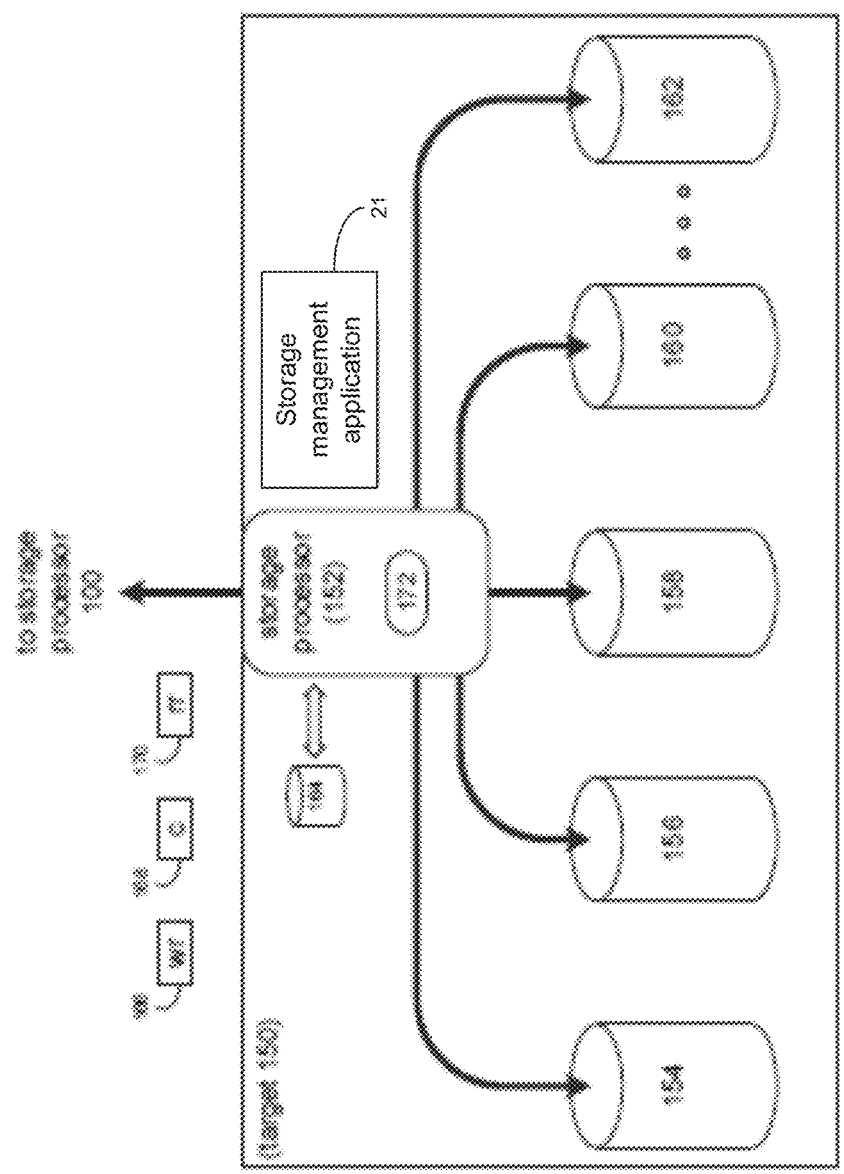
FIG. 3 is an example diagrammatic view of a storage target of FIG. 1 according to one or more example implementations of the disclosure.
Figure 4:
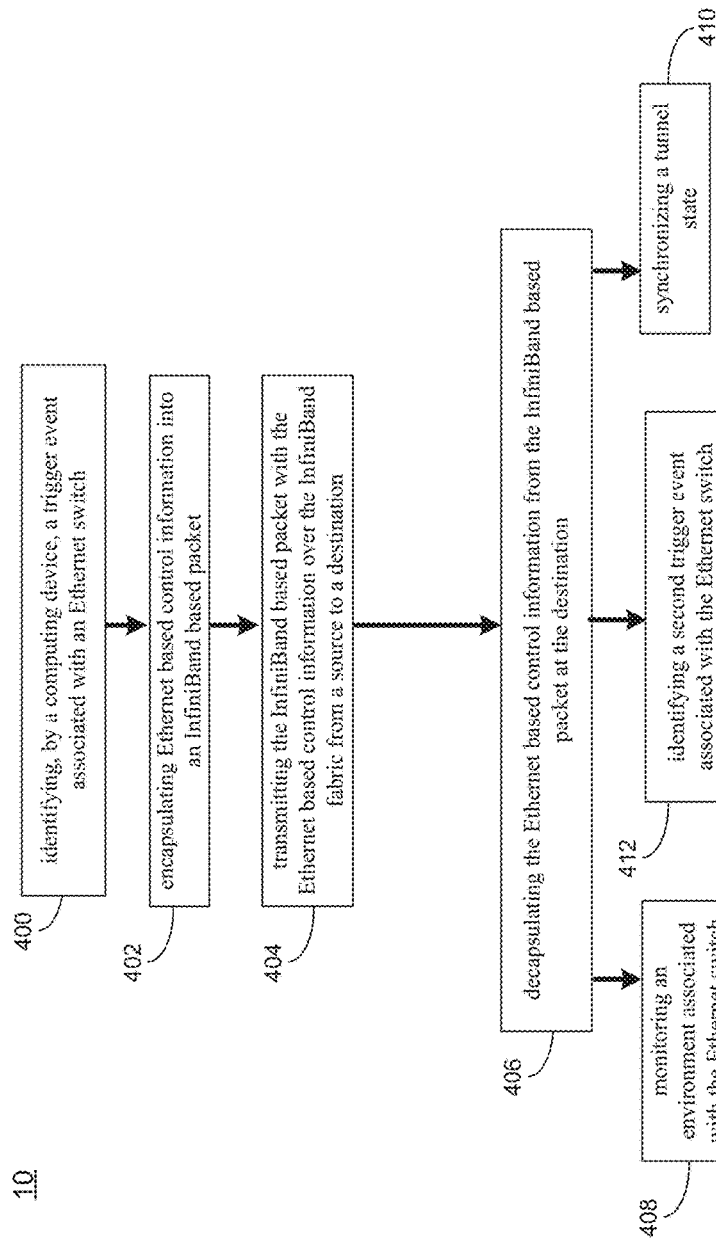
FIG. 4 is an example flowchart of a switch process according to one or more example implementations of the disclosure.

Data Storage System:

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management application 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management application 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management application 21). Additionally/alternatively (e.g., when storage processor 100 is configured as an application server or otherwise), content 118 to be written to computer 12 may be internally generated by storage processor 100 (e.g., via storage management application 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or switch process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management application 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets:

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management application 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management application 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management application 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management application 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management application 21) and initially stored (e.g., via storage management application 21) within front end cache memory system 172.

As will be discussed below, switch process 10 may at least help, e.g., the improvement of an existing storage technology, necessarily rooted in computer technology in order to overcome an example and non-limiting problem specifically arising in the realm of data storage. For instance, switch process 10 may use an efficient process to improve the mitigation of communication loss during, e.g., power failure of Ethernet switches.

The Switch Process:

As discussed above and referring also at least to the example implementations of FIGS. 4-7, switch process 10 may identify 400, by a computing device, a trigger event associated with an Ethernet switch. Switch process 10 may encapsulate 402 Ethernet based control information into an InfiniBand based packet. Switch process 10 may transmit 404 the InfiniBand based packet with the Ethernet based control information over the InfiniBand fabric from a source to a destination. Switch process 10 may decapsulate 406 the Ethernet based control information from the InfiniBand based packet at the destination.

Figure 5:
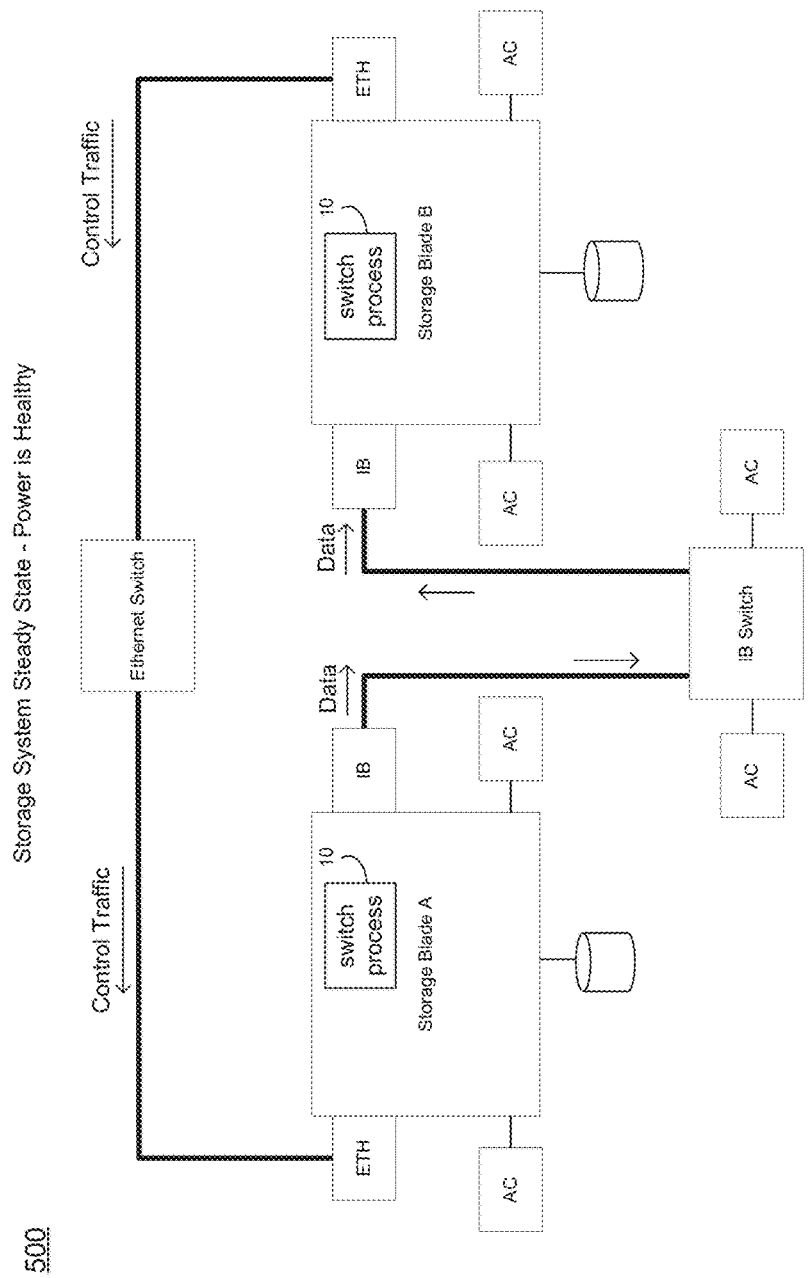
FIG. 5 is an example diagrammatic view of an example storage system of FIG. 2 according to one or more example implementations of the disclosure.
Figure 6:
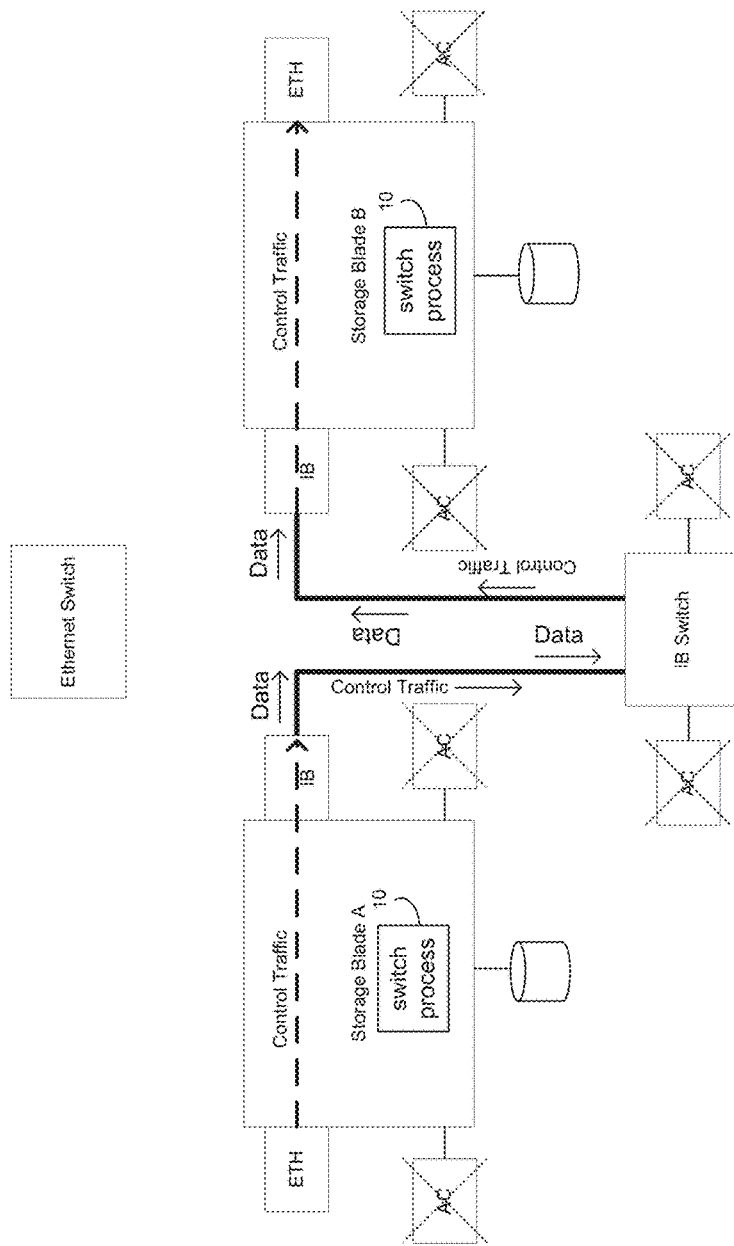
FIG. 6 is an example diagrammatic view of an example storage system of FIG. 2 according to one or more example implementations of the disclosure.
Figure 7:
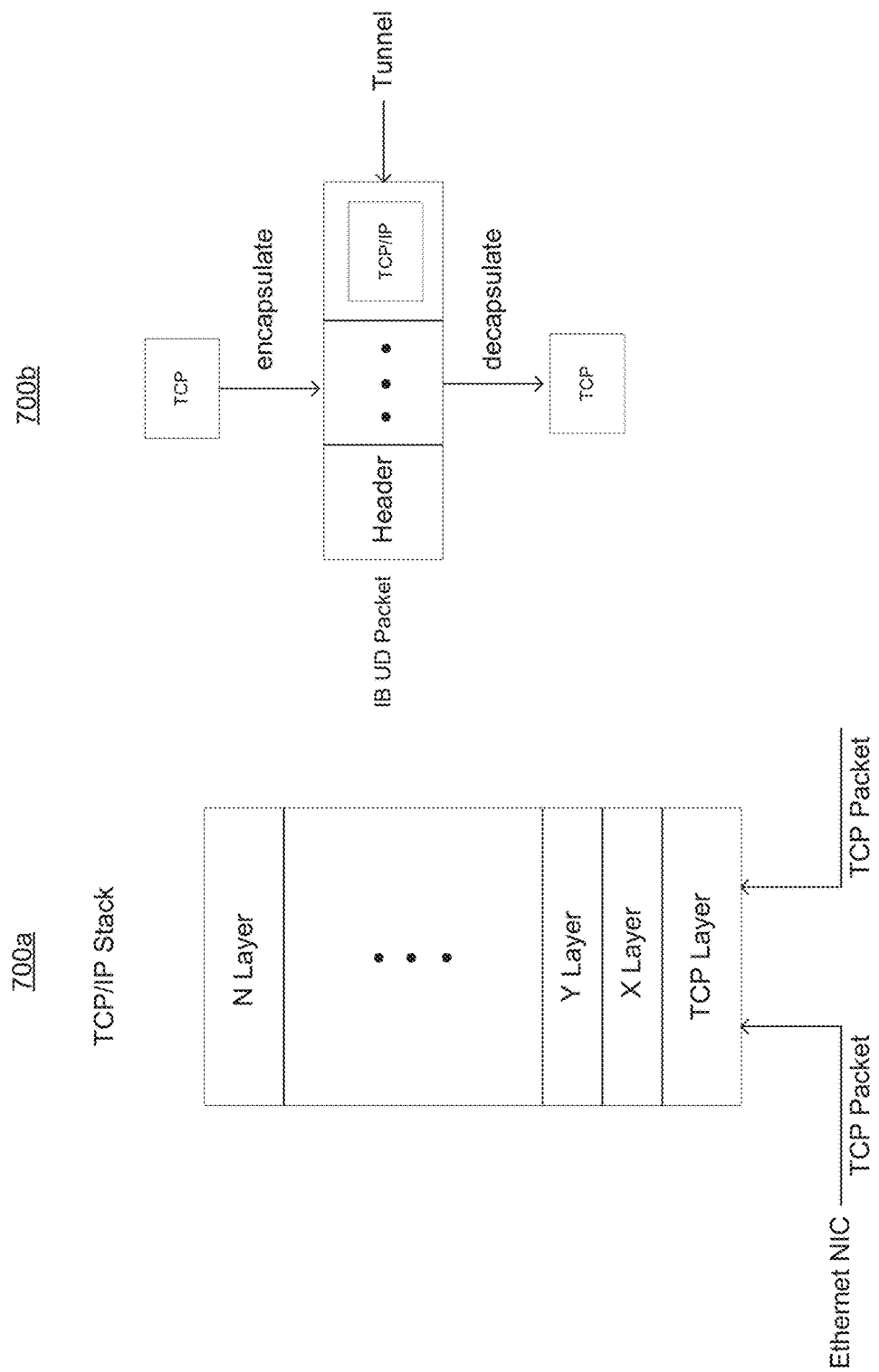
FIG. 7 is an example diagrammatic view of an example TCP/IP stack and encapsulated information according to one or more example implementations of the disclosure.

In some implementations, and referring at least to the example FIG. 5, an example storage system 500 is shown. In the example, storage system 500 may connect internal Ethernet network interfaces on each computing device (e.g., storage blade A and storage blade B, storage blade N, etc.) using an Ethernet switch, so that control traffic information (e.g., TCP/IP information) may be exchanged between the computing devices. Storage system 500 may further include InfiniBand (IB) network interfaces coupled to each computing device, so that data traffic may be exchanged between the computing devices (e.g., directly and/or via an IB switched fabric). Generally, the computing devices and the IB switch are coupled to a power source (e.g., AC power from a wall outlet), and each may have battery as a backup power source, should the primary power source fail (e.g., power outage). However, Ethernet switches generally do not include a battery backup due to their associated costs. Therefore, a power loss event from these Ethernet switches may result in internal Ethernet network failure (e.g., as various Ethernet end points may not be otherwise reachable).

In some implementations, switch process 10 may identify 400, by a computing device, a trigger event associated with an Ethernet switch. For instance, assume for example purposes only that storage system 500 is operating without any known issues (e.g., power issues). In the example, switch process 10 may monitor 408 an environment associated with the Ethernet switch. For instance, in some implementations, switch process 10 may monitor 408 and collect various information of one or more components of storage system 500 (e.g., Ethernet switch, storage blades, IB switch, etc.). In some implementations, the environment associated with the Ethernet switch that may be monitored may include one or more power states (e.g., power states of Ethernet switch, storage blades, IB switch, etc.).

In some implementations, at least one of the one or more power states may indicate usage of backup power. For instance, and referring at least to the example implementation of FIG. 6, assume for example purposes only that a storage system (e.g., storage system 600) has incurred a power failure. For example, primary power to storage blade A, storage blade B, and the D3 switch may be interrupted, causing their respective batter backup (or other backup power supply) to begin supplying their power. In the example, switch process 10 may identify 400 the trigger event that one or more of the components of storage system 600 is running on backup power (e.g., backup battery). In some implementations, the identified 400 trigger event may be the loss of power to one or more of the components of storage system 600. As such, any indication of any type of power loss (directly or indirectly) may be the identified 400 trigger.

In some implementations, switch process 10 may provide an independent state machine that may be used to generate the trigger (e.g., using an API). In some implementations, on each computing device, the state of both Ethernet switches' AC power may be communicated at regular intervals to switch process 10. In some implementations, each computing device may propagate its power zone knowledge of power states to each other computing device for verification. For instance, assuming only two blades for example purposes only, when both blades (via switch process 10) identify 400 the same state of an AC power zone, it may be deemed correct and may be used as the AC power state of the corresponding Ethernet Switch. This may reduce spurious triggers and unnecessary tunneling toggling on/off due to transient conditions or faulty hardware.

In some implementations, if the AC state is not same (e.g., due to some issue or it cannot be determined reliably), then an unknown Ethernet switch AC power state may be sent via switch process 10. On receiving an unknown state, a tunneling API (via switch process 10) may maintain the previously known AC power state of the switch for reliability.

In some implementations, switch process 10 may encapsulate 402 Ethernet based control information into an InfiniBand based packet. For instance, and referring also at least to the example implementation of FIG. 7, an example TCP/IP stack 700a and encapsulated packet 700b is shown. In the example, switch process 10 may intercept the TCP/IP Ethernet based control information that can no longer be transmitted via the Ethernet switch (e.g., due to power failure), and may encapsulate 402 the control information into an InfiniBand based packet (e.g., using UD (Unreliable Datagram) Queue Pair transport services to send the message to a particular destination) by adding a special message header to the TCP/IP packet, such as encapsulated packet 700b (e.g., a IB UD packet), as it moves through TCP/IP stack 700a.

In some implementations, switch process 10 may transmit 404 the InfiniBand based packet with the Ethernet based control information over the InfiniBand fabric from a source to a destination. For instance, once the Ethernet based control information that can no longer be transmitted via the Ethernet switch is encapsulated into a format acceptable to the IB switch fabric, encapsulated packet 700b may be transmitted 404 over the D3 fabric from the source (e.g., blade A) to the destination (e.g., blade B) (e.g., via IB UD QP messages).

In some implementations, switch process 10 may decapsulate 406 the Ethernet based control information from the InfiniBand based packet at the destination. For instance, assuming encapsulated packet 700b has been successfully transmitted 404 to and received by the destination, switch process 10 may decapsulate 406 the Ethernet based control information from the InfiniBand based packet (e.g., by parsing the message header to recognize the packet as a "tunneling" packet and push it to the TCP/IP stack). As a result, "tunneling" storage system Ethernet traffic over an internal D3 switched fabric may increase system wide availability of critical system communication (or other system communications) during power failure events, even if such power failure events occur during the vaulting of data onto SSDs, which may be essential to ensure user data is not lost.

In some implementations, the identified trigger event may enable transmitting 404 the InfiniBand based packet with the Ethernet based control information over the InfiniBand fabric, and in some implementations, switch process 10 may identify 412 a second trigger event associated with the Ethernet switch, wherein the second trigger event may disable transmitting 404 the InfiniBand based packet with the Ethernet based control information over the InfiniBand fabric. For instance, each computing device (e.g., blade A and blade B) may make its own decision to tunnel or not, based on all the tunneling triggers present, and since the same tunneling triggers may be propagated to all the computing devices, each computing device and effectively storage system 600 overall may end up in the same tunneling state.

Generally, the decision to tunnel over IB or not may depend upon various scenarios using the following tunneling example management architecture/framework. For instance, in some implementations, there may be at least two categories of tunneling triggers. For example, one which may enable tunneling and one which may disable tunneling over IB. For either trigger category, there may be "n" triggers, where each trigger may be independent of each other. In some implementations, each trigger may have a tunnel event trigger scope and an event propagation scope, which may decouple each trigger to be generated and propagated as needed, completely independent of each other.

In some implementations, a trigger may have its own state machine, which when enabled on demand, may continuously check whether that trigger needs to be generated and or not. A trigger, along with trigger scope, propagation scope and its state machine, may be added to model any scenario as needed. This may make the overall architecture and design modular, efficient, scalable, and also applicable to new transports in the future.

In some implementations, if switch process 10 determines it is in tunneled mode and a disable tunnel trigger occurs (e.g., power is restored, the component is no longer on backup battery, etc.), switch process 10 may automatically transition out of tunneling mode and stay in regular Ethernet mode (e.g., where control traffic information such as TCP/IP information is sent over Ethernet and data traffic information is sent over InfiniBand fabric using IB protocol). If and when the disable tunneling trigger goes away, the tunneling state may be re-evaluated (via switch process 10) and if an enable tunnel trigger is present, then switch process 10 may automatically transition to tunneling mode. It will be appreciated that this transition into and out of tunneling mode may happen manually and/or automatically based on various enable and disable tunneling triggers.

In some implementations, switch process 10 may synchronize 410 a tunnel state. For example, assume for example purposes only that all the computing devices are in tunneling state and one of the computing devices reboots or needs to be replaced. In that example, that computing device may lose its tunneling state and may no longer go back in tunneling state by itself. In some implementations, switch process 10 may address this by enabling each computing device to detect that the IB logical path is down and no longer available to that computing device, and all the computing devices may then be instructed to exit tunneling mode at that point.

In some implementations, the tunneling state synchronization across all computing devices may also be achieved by sending all the global ping and tunneling data to all computing devices using, e.g., both Ethernet and IB transports, and if a computing device detects that it is not in a tunneling state like others, it may then enter the tunneling state.

In some implementations, storage system 600 may include a tunneling control block per slot, which may be shared across all the instances on the slot (via switch process 10). This may maintain the overall tunneling state of the computing device, and various tunneling events may be used to sync up the tunneling state on all the instances. In some implementations, there may be a tunneling local control block per instance and may be used to maintain the tunneling state of the instance.

In some implementations, there may be multiple tunnel event trigger sources. For instance, they may include:

Ethernet switch has AC power loss or no power loss.

Ethernet switch has AC power, but it is available or not available.

An engine has both Ethernet subnets up or down.

Manual override, which may override any existing tunneling state and may be used primarily for debugging or recovering, if needed.

Start or stop monitoring for tunneling, which may allow the tunneling functionality to be enabled or disabled on demand and not enabled by default. For instance, if both Ethernet switches have AC power, then trigger disable tunneling and stop monitoring for tunneling. As another example, if only one Ethernet switch has AC power loss, then start monitoring for tunneling. As yet another example, if both Ethernet switches have AC power loss, then trigger tunneling to be enabled.

In some implementations, any tunnel event may be generated on a specific instance or all the instances on a computing device. For example, a tunneling event may be generated in the following example and non-limiting scenarios:

Both Ethernet switches have AC power loss or no power loss.

Both D3 switches are not available or a path to a computing device is not available (e.g., when both IB switches are not available, then tunneling is not allowed, and if a local path to any computing device is not available, then tunneling is not allowed).

Both Ethernet subnets on an engine not available (e.g., if an engine does not have both Ethernet subnets completely available, then it triggers to enable tunneling, and if both Ethernet switches/subnets are not completely available, then it triggers to enable tunneling; however, since tunneling events may be effectively ignored until the identification of AC power loss on one Ethernet switch, this case may be limited to one Ethernet switch that has AC loss and another not being available).

Both Ethernet switches powered on, but both Ethernet subnets not available (e.g., when there is an Ethernet connectivity issue present on both Ethernet subnets, like an MM cable missing or an MM down, then switch process 10 may triggers tunneling. This trigger may become effective when the Ethernet connectivity issue is present on the other Ethernet switch).

Override tunneling state to tunneling on or off or remove any override, if present.

It will be appreciated that while only a single switch and two computing devices (e.g., blades) are described and shown in the figures, various other implementations with additional computing devices and switches may be used without departing from the scope of the disclosure. It will also be appreciated that while specific protocols are used, any compatible and appropriate protocol may be used without departing from the scope of the disclosure.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
   identifying, by a computing device, a first trigger event associated with an Ethernet switch;
   monitoring an environment associated with the Ethernet switch, wherein the environment associated with the Ethernet switch includes one or more power states;
   propagating power zone information, relative to the computing device, of the one or more power states to at least a second computing device for verification;
   identifying a second trigger event associated with the Ethernet switch, wherein each trigger event includes a tunnel event trigger scope and an event propagation scope that decouple each trigger event to be generated and propagated independent of each other wherein at least one source of a tunnel event trigger relative to the tunnel event trigger scope includes a start and stop mechanism for monitoring a tunnel event;
   encapsulating Ethernet based control information into an InfiniBand based packet;
   transmitting the InfiniBand based packet with the Ethernet based control information over the InfiniBand fabric from a source to a destination; and
   decapsulating the Ethernet based control information from the InfiniBand based packet at the destination.

2. The computer-implemented method of claim 1 wherein at least one of the one or more power states indicates usage of backup power.

3. The computer-implemented method of claim 1 further comprising synchronizing a tunnel state, wherein if one or more computing devices leaves the tunnel state, then each remaining computing device in the tunnel state is enabled to exit a tunneling mode relative to each trigger event.

4. The computer-implemented method of claim 1 wherein the first trigger event enables transmitting the InfiniBand based packet with the Ethernet based control information over the InfiniBand fabric.

5. The computer-implemented method of claim 1 wherein the second trigger event disables transmitting the InfiniBand based packet with the Ethernet based control information over the InfiniBand fabric.

6. A computer program product residing on a non-transitory computer readable storage medium having a plurality of instructions stored thereon which, when executed across one or more processors, causes at least a portion of the one or more processors to perform operations comprising:
    identifying a first trigger event associated with an Ethernet switch;
    monitoring an environment associated with the Ethernet switch, wherein the environment associated with the Ethernet switch includes one or more power states;
    propagating a power zone, relative to the computing device, of the one or more power states to at least a second computing device for verification;
    identifying a second trigger event associated with the Ethernet switch, wherein each trigger event includes a tunnel event trigger scope and an event propagation scope that decouple each trigger event to be generated and propagated independent of each other wherein at least one source of a tunnel event trigger relative to the tunnel event trigger scope includes a start and stop mechanism for monitoring a tunnel event;
    encapsulating Ethernet based control information into an InfiniBand based packet;
    transmitting the InfiniBand based packet with the Ethernet based control information over the InfiniBand fabric from a source to a destination; and
    decapsulating the Ethernet based control information from the InfiniBand based packet at the destination.

7. The computer program product of claim 6 wherein at least one of the one or more power states indicates usage of backup power.

8. The computer program product of claim 6 wherein the operations further comprise synchronizing a tunnel state, wherein if one or more computing devices leaves the tunnel state, then each remaining computing device in the tunnel state is enabled to exit a tunneling mode relative to each trigger event.

9. The computer program product of claim 6 wherein the first trigger event enables transmitting the InfiniBand based packet with the Ethernet based control information over the InfiniBand fabric.

10. The computer program product of claim 6 wherein the second trigger event disables transmitting the InfiniBand based packet with the Ethernet based control information over the InfiniBand fabric.

11. A computing system comprising:
    one or more processors; and
    one or more memories storing instructions executed by the one or more processors to perform operations comprising:
        identifying a first trigger event associated with an Ethernet switch;
        monitoring an environment associated with the Ethernet switch, wherein the environment associated with the Ethernet switch includes one or more power states;
        propagating power zone information, relative to the computing device, of the one or more power states to at least a second computing device for verification;
        identifying a second trigger event associated with the Ethernet switch, wherein each trigger event includes a tunnel event trigger scope and an event propagation scope that decouple each trigger event to be generated and propagated independent of each other wherein at least one source of a tunnel event trigger relative to the tunnel event trigger scope includes a start and stop mechanism for monitoring a tunnel event;
        encapsulating Ethernet based control information into an InfiniBand based packet;
        transmitting the InfiniBand based packet with the Ethernet based control information over the InfiniBand fabric from a source to a destination; and
        decapsulating the Ethernet based control information from the InfiniBand based packet at the destination.

12. The computing system of claim 11 wherein at least one of the one or more power states indicates usage of backup power.

13. The computing system of claim 11 wherein the operations further comprise synchronizing a tunnel state, wherein if one or more computing devices leaves the tunnel state, then each remaining computing device in the tunnel state is enabled to exit a tunneling mode relative to each trigger event.

14. The computing system of claim 11 wherein the second trigger event disables transmitting the InfiniBand based packet with the Ethernet based control information over the InfiniBand fabric, and wherein the first trigger event enables transmitting the InfiniBand based packet with the Ethernet based control information over the InfiniBand fabric.

* * * * *